United States Patent [19]
Ho

[11] Patent Number: 5,992,398
[45] Date of Patent: Nov. 30, 1999

[54] FUEL SAVER DEVICE AND PROCESS FOR USING SAME

[75] Inventor: James Ho, Dix Hills, N.Y.

[73] Assignee: EW International Mfg., Inc., Brentwood, N.Y.

[21] Appl. No.: 09/070,340

[22] Filed: Apr. 30, 1998

[51] Int. Cl.⁶ .................................................. F02B 75/00
[52] U.S. Cl. ......................................................... 123/538
[58] Field of Search ................................... 123/536, 537, 123/538; 210/222

[56] References Cited

U.S. PATENT DOCUMENTS

| | | | |
|---|---|---|---|
| 4,461,262 | 7/1984 | Chow | 123/538 |
| 4,572,145 | 2/1986 | Mitchell et al. | 123/538 |
| 5,124,045 | 6/1992 | Janczak et al. | 123/538 |
| 5,129,382 | 7/1992 | Stamps et al. | 123/538 |
| 5,271,369 | 12/1993 | Melendrez | 123/538 |
| 5,664,546 | 9/1997 | De La Torre Barreiro | 123/538 |
| 5,716,520 | 2/1998 | Mason | 123/538 |

*Primary Examiner*—Marguerite McMahon
*Attorney, Agent, or Firm*—John F. Vodopia, Esq.

[57] ABSTRACT

An improved fuel line insert includes a cylindrical housing extending between oppositely disposed input and output ports, and constructed to include inner and outer chamber surfaces, such that an internal volume is realized in a form of an internal chamber extending between the input and output ports. At least two permanent magnets oppositely disposed from each other and mounted at each magnet's south pole into the inner chamber surface such that each magnets north poles face each other in the chamber in such an arrangement that fuel may flow between the two. The improvement lies in strength of the material comprising the casing and the magnets which is a result of construction of same with a nickel/low carbon steel alloy.

9 Claims, 1 Drawing Sheet

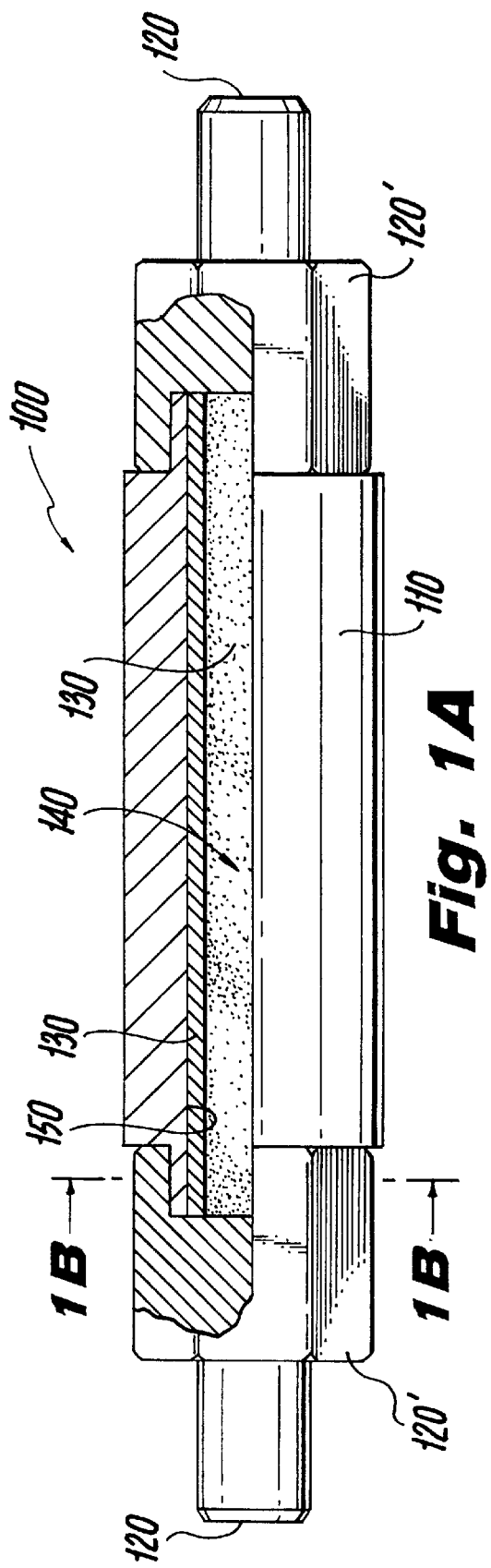
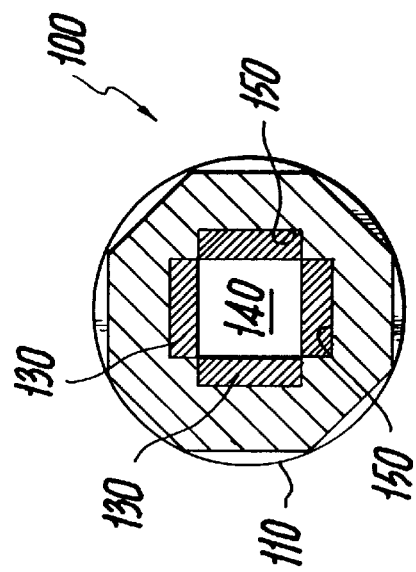

FUEL SAVER DEVICE AND PROCESS FOR USING SAME

BACKGROUND OF THE INVENTION

The present invention relates to improving fuel efficiency, and more particularly relates to improving the efficiency and operating ability of conventional fuel line inserts known to use permanent magnets to impose magnetic energy upon fuel molecules flowing through the insert en route to a combustion chamber prior to combustion therein.

Many and various apparatus, devices, and the like are known which claim to increase the efficiency of fuel consumption (combustion) by processing and/or conditioning a fuel mixture prior to the mixture's combustion. For example, U.S. Pat. No. 5,129,382 discloses a device for improving fuel efficiency which includes at least one magnet for magnetically "charging" fuel fluids fed through a fluid passageway into a combustion chamber of an apparatus with which the device is used. The '382 device includes a housing containing the at least one permanent magnet positioned adjacent the fluid passageway, where the north pole of the magnet preferably faces the fluid passageway. The '382 patent asserts that the magnetic field created by the at least one permanent magnet is responsible for an improved fuel efficiency, an improved power production a reduction of carbon build-up on engine parts, and a reduction of pollutants normally found in combustion exhaust gases. The fluid passageway is preferably made of non-magnetic material. The magnetic cores are preferable made of nickel, ceramic, high carbon steel, etc.

Examples of other devices which utilize magnetism to improve the fuel-combustion efficiency of combustion engines are shown in U.S. Pat. Nos. 4,381,754, 4,461,262, 4,572,145, 4,188,296, 5,129,382, and Chinese Patent No. 94231684.3 to Hou et al., issued Dec. 20, 1996. In particular, U.S. Pat. No. 4,461,262 discloses a fuel treatment device comprising a fuel line and a pair of magnets positioned at an inlet for incoming fuel. Each of the magnets is positioned with its south magnetic pole arranged to face upstream of the fuel line and its north magnetic pole placed closest to a mixing zone. Fuel passes initially through the flux generated by the south pole, and then the flux of the opposed north pole, allegedly improving combustion efficiency.

In addition, U.S. Pat. No. 4,572,145 discloses a magnetic fuel treatment device comprising a magnet embedded in a unshaped body of non-magnetic material adapted to fit over a fuel line. The magnet is positioned so that its north pole is spaced apart from the fuel line and its south pole is adjacent the fuel line. It is the flux imposed by the magnet's south pole which affects the fuel as alleged in the patent document. The magnet is embedded in a unshaped body of a non-magnetic material adapted to fit over the fuel line.

U.S. Pat. No. 4,188,296 discloses a magnetizing apparatus used to apply a magnetic field to fuel to impart a magnetic flux density of at least 10 gauss to the fuel. A plurality of magnets are disposed within a casing and oriented such that magnetic forces are produced and directed to the fuel to be processed. The processing occurs as the fuel flows past the casing, and preferably, is also arranged to impart the device's diametrically opposed field to any steam or air to be mixed with the fuel at combustion U.S. Pat. No. 5,129,382 discloses a device for use with a fuel combustion apparatus for improving the efficiency of fuel combustion and to reduce polluting emissions. At least one magnet is constructed into a fuel fluid passageway, with its north pole proximate and/or facing the fuel passageway in order that the magnetizing force imposed by the north pole of the magnet negatively charges the fuel for combustion. The fluid passageway and magnet are housed in a casing with a casing cover, and preferably including at least two magnets arranged in the chamber in diametric opposition. The '382 patent calls out a housing comprised of any material, such as plastic or metal, but preferably non-magnetic, and calls for magnets comprising cobalt, nickel, aluminum, copper or iron, or any material with a high retentivity and coercivity such as Alnico material, ceramic, high carbon steel, or other steel alloys or some combination thereof. Fuel molecules tend to move more quickly and more readily disperse within the combustion chamber. The magnetic pairs are preferably formed of materials possessing high retentivity and coercivity.

Chinese Patent No. 94231684.3 to Hou et al (the Hou et al. patent) discloses a fuel efficiency improving device which utilizes the magnetic field generated by pairs of diametrically opposed permanent magnets which comprise the device (the "Hou patented device"), incorporated by reference herein. The Hou Chinese Patent describes the Hou patented device as a magnetic energy-saving purifier element and asserts in the writing that the use of same device will markedly increase the combusting efficiency of gas- and/or oil-burning (powered) machinery, such as trucks, automobiles, etc., that is, internal combustion engines up to twenty percent (20%). The Hou et al. Chinese patent disclosure asserts that fuel processing by the device is the result of a stationary magnetic field imposed at a particular portion of the purifier element (improved fuel-saver device) where all fuel must pass to enter the combusting chamber, which affects the moving fluid/gas at the molecular level (microscopically). In particular, the Hou Chinese patent asserts that the magnetic field generated by the permanent magnet(s) by their physical positioning in the Hou device construct affects the magnetic spin of various parts or sub-parts of the fuel molecules passing through the magnetic field.

One known result or affect of the diametrically opposed fields directed by the physical arrangement of the permanent magnetic pairs constructed into the Hou patented device is their effect on the downsizing of large hydrocarbon molecules present in the liquid fuel mixture to smaller molecules. The size of molecules comprising the fuel mixture affects or limits any geometry in which such molecules can possibly arrange themselves as a fluid mass. Of course, the molecular arrangment directly affects the velocity of the fuel, atomization of the fluid mass at the combustion chamber, fuel molecule ignition and fuel molecule combustion.

The Hou et al. purifier element comprises a cylindrical purifier housing or casing, with fuel input and output ports located at opposite ends of the housing, respectively. The cylindrical housing provides an internal cavity or channel extending between the input and output ports, which acts as a fluid communication path between the input and output ports. The dimensions of the channel are defined by various geometric configurations and arrangment of the magnets which may be fixedly attached to internal channel surfaces. The variable length and diameter of the channel, as well as the flow per unit volume through the channel, effects the time and therefore the strength of the field its influence on the molecular arrangment of the passing fuel molecules. For example, while the Hou et al. outer casing shape is cylindrical, the channel may include four, six, eight, etc., flat planar inner surfaces at 90 degrees, 60 degrees, 45 degrees, etc., respectively, relative each surface's neighboring surfaces.

Embedded in each flat, planar surface is a permanent magnet arranged so that the permanent magnet's north pole extends into the volume of the chamber itself (it is attached at its south pole to the inner surface of the chamber or channel). The magnets are arranged in pairs such that the north pole of each magnet is located directly opposite a north pole of a second magnet. This essentially establishes diametrically opposed forces between each magnetic pair. For that matter, the dimensions further qualify the physical dimensions (e.g., inner volume/unit length) of the fuel flow chamber. Hence, any fuel (any fluid for that matter) passing through the channel to a combustion chamber (or some other type chamber) is subjected to the aggregate magnetic forces generated by the interaction of the north poles of each individual magnet and its effect relative to the fuel flow. Hence, the strength of the force imposed on the passing fuel, which increases with the number of magnetic pairs and the length of time the fuel is under the influence of the aggregate magnetic forces determines the effectiveness of the fuel processing en masse.

Combustion efficiency of hydrocarbon fuels is quantified by comparing amounts of non-combusted hydrocarbons within combustion emissions retained for testing. And the Hou et al. patent asserts that subjecting a fuel flow to the magnetic processing it discloses, within the physical dimensions of the device, realizes a reduction of methane found in the fuel combustion emissions by up to ninety percent (90%) compared with amounts of methane found in emissions tested under similar combusting conditions without magnetic processing. Hou et al. also claims that non-methane hydrocarbons typically found in emissions are also reduced by its magnetic processing by about sixty (60) to ninety percent (90%).

Besides data collected during testing in automobile combustion engines, Hou et al. also provides results of its testing of emission gases generated by gas stoves in which the Hou element was installed. With gas stoves, inserting a Hou et al. patented device in the fuel flow line before the gas burner of a gas stove shows methane emissions reduced by eighty (80) to ninety percent (90%) in the combusted emissions. That is, the Hou et al. purifier element's construction, and, therefore, the arrangement of the magnetic field it generates affects the fuel molecules by rendering same more readily flowable (less viscous), more readily atomized and combusted more readily at the place of combustion. Stated another way, the Hou et al. fuel processing insert renders more available complementary atoms or ions which must interact to burn during the combustion process.

The Hou et al. patent calls out the preferred composition of the casing (housing) and/or magnetic core (magnets) to be highly conductive metals, and most preferably, low carbon steel. In the alternative, such materials from which the casing and/or magnets are made should be heat and/or pressure-resistant, whether metal or non-metal. Where the material comprising the casing and/or magnets is constructed of magnetically responsive material, the field effect is intensified. Because of the correlation between field strength and effectiveness of the device operation, magnetically responsive casing and/or magnetic core materials which may enhance fuel combustion efficiency. And while the Hou et al. patented technology is believed to effectively increase fuel burning efficiency, a natural consequence of same is an increase in combustion energy derived per unit volume of fuel combusted.

Nevertheless, in view of the fact that the hydrocarbon energy store in our planet is finite, further improvements in the technology would be welcomed by fuel consumers and environmentalists alike. That is, a ten or twenty percent increase in the efficiency of a fuel efficiency improvement device renders such device that much more valuable and effective.

OBJECTS AND SUMMARY OF THE INVENTION

It is therefore an object of this invention to provide a fuel processing apparatus which further improves the fuel-combustion efficiency of conventional fuel combustion efficiency improvement devices and/or apparatus.

It is another object of the invention to provide a structural improvement to a fuel-efficiency increasing apparatus or improved fuel-saver devices of the prior art for use with internal combustion engines.

It is another object of this invention to realize a fuel line insert which provides up to a ten percent improvement in the combustion efficiency provided by conventional magnet-based fuel efficiency inserts, particularly those in use with internal combustion engines in use in cars, motorcycles, buses, planes, truck engines, etc., as well as many other fuel combustion apparatus such as home heating units and the like.

In one embodiment, the improved fuel-saver device of the present invention is constructed substantially according to the art disclosed in the Hou et al. Chinese patented insert, described in great detail above, but with a significantly more responsive and significantly more improved magnetic core material, providing the basis for the improved fuel combustion efficiency realized by use of applicant's fuel-saver device. The magnetic core material is constructed of a special alloy comprising nickel in a range of between 1 milligram and tens grams, combined with between 999.999 and 990 grams of low carbon steel, preferably at a ration of 5 grams of Ni per 995 grams of low carbon steel. of nickel.

In the same embodiment, material comprising the casing is also manufactured from a special alloy comprising nickel in a range of between 1 milligram and tens grams, combined with between 999.999 and 990 grams of low carbon steel, preferably at a ration of 5 grams of Ni per 995 grams of low carbon steel. of nickel . The improved fuel-saver device of applicant's invention is also supported by the geometric shape of the device's outer casing or housing, which is preferably cylindrical. The significant difference between the material comprising the casing which is recited as part of the Hou et al. device, and the material comprising the outer casing of the device of this invention is that the present invention's improved fuel-saver device is that this invention utilizes a nickel enhanced steel alloy, as described in detail above, which alloy imparts increased strength to the aggregate field imposed on the fuel molecules passing through the device. Hence, the fuel-saver device of this invention renders a significant improvement over the Hou et al. fuel line insert.

BRIEF DESCRIPTION OF THE DRAWINGS

FIG. 1A is a schematic diagram of a first embodiment of an apparatus or improved fuel-saver device of this invention; and FIG. 1B is a schematic diagram of a cross-section of the embodiment of the invention shown in FIG. 1A.

DETAILED DESCRIPTION OF THE PREFERRED EMBODIMENTS

The present invention embodies an improvement over the existing art of processing fuel molecules through the use of a magnetic field imposed at a particular portion of a flow path traveled by fuel molecules towards a place of combustion. Various apparatus/techniques are known to exist in the art which attempt to render fuel combustion more efficient and therefore realize the potential benefits of same. One prior art technology in particular utilizes various apparatus which impose a magnetic field on fuel molecules before combustion in an attempt to render the fuel molecules more readily combustible. That is, because hydrocarbon fuel molecules are effected by a static magnetic field, particularly re cohesive intermolecular non-covalent forces, groupings of large hydrocarbons flowing through a magnetic field may have their magnetic orientation aligned with the direction of the magnetic field vector. In addition, Van Der Vals forces existing between the fuel molecules is considerably reduced or suppressed, depending on the intensity of the field and the time the fuel mass is subjected at the flow rate.

The invention shows quantitative improvement in the combustion of hydrocarbons (various length hydrocarbon molecules), whether gas or oil. That is, there are two major covalent bonds comprising hydrocarbon fuels, C—C and C—H. Both release energy when broken. One of the problems with combusting varying quantities of such hydrocarbon-based molecules is with their inherent tendency to aggregate as well as the length and magnetic orientation of the fuel en masse, as explained in some detail above. When subjected to the field strength imposed by the fuel-saver device of this invention, the molecules resonate within and by the magnetic field energy. In addition, the magnetic orientation of the fuel molecules may "flip", that is, change its spin from one spin direction to the opposite spin state when subjected to the magnetic field.

Magnetized fuel molecules moving en masse towards a point of combustion are more readily atomized at a fuel injection nozzle than fuel molecules which have not been processed by the present invention. In addition, it is found that groupings of hydrocarbons are made repulsive under a large magnetic field for more effective dispersion in the combusting chamber. The processed hydrocarbons, when pyrolized, generate atomic carbon and hydrogen which is reacted reducing soots in emissions. The fineness of the atomization of the magnetized fuel molecules accelerates oxidation which more efficiently uses oxygen, decreasing CO and increasing CO2.

The improved condition of the fuel after passing through the field(s) generated by the inserts is a result of its changed molecular interrelationship of the aggregate fuel molecules (e.g., its viscosity) which evidently improves the ability of those known fuel line inserts. The improved fuel-saver device of the present invention is constructed substantially to that of the Hou et al. prior art fuel line insert, described in detail above, but with a significantly more responsive and improved magnetic core material, as well as the material comprising the casing, whereby gauss field may be generated in a range of 3000 to 7000 gauss.

That is, the improved fuel-saver device of applicant's invention includes an outer casing or housing, which is preferably cylindrical (similar to that called out by Hou et al.), but comprises magnets and casing constructed from a low carbon steel nickel alloy. Because of their nickel-steel alloy construction, the field generated and directed by each magnet is increased thereby significantly improving applicant's device's ability to render more efficient fuel combustion when attached to a fuel line upstream of a combustion chamber. The use of the nickel enhanced steel alloy imparts increased physical strength to the casing which must hold the magnets fixedly in view of the strong emf generated and imposed by each magnet.

In particular, the improved fuel-saver device 100 of the invention (FIGS. 1A and 1B) includes a casing 110 comprising a nickel steel alloy. The casing is preferably cylindrical, having adaptive openings 120 at each cylindrical end 120'. The adaptive openings allow the ends of the improved fuel-saver device 100 to be physically connected to both ends of a fuel line (not shown in the drawing figures) created by severing the line to install the insert. The improved fuel-saver device 100 may, therefore, be installed in the fuel line of new or presently operating machines within a run or length of fuel line (not unlike an in-line gas filter) proximate the carburetor or fuel combustion chamber, as the case may be. However, special care must be taken when positioning the device near heated surfaces for obvious reasons.

The casing 110 construction defines an internal volume or chamber 140 between the two ends 120. The internal chamber's 140 shape is defined by the number of internal surfaces which make up the chamber. That is, the chamber may be square, rectangular, octagonal, etc., depending on the number of surfaces making up the inner casing wall. In the case of a square inner chamber, the chamber is defined by four, flat, equally-sized surfaces 150, the planes of which are positioned at ninety degree angles and forming square-shaped inner chamber or volume 140. Permanent magnets 130, made in accordance herein, are positioned on the inner surfaces 150, where the south pole of the magnet is in direct contact with surface 150. The cores of the magnets comprising the device are made from a nickel steel alloy. Because the north poles of the four magnets are arranged in a diametrically opposed fashion, the material used to encase them must be very strong, preferably conductive.

The north pole of the same magnet extends into the inner chamber 140 though which fuel is compelled to flow. For example, in a case where there are four internal housing or casing surfaces (defining a square chamber), four permanent magnet's are attached to the casing surfaces at their south poles so that each magnet's north pole faces the chamber. Of course the four north poles define a square chamber and generate fields which are essentially orthogonal, or opposed. The increased strength of the opposing fields generated by the four magnets in the square design requires that the magnets be contained in a casing comprised of the improved nickel-low carbon steel alloy referred to herein. With the increased strength, the chamber length, and the corresponding time in which the fuel must be present within the field, may be shortened.

In principle, the thickness of the magnet should be larger than or equal to half of the magnetic gap between facing magnets. The length of the magnets which comprise or are affixed to the inner channel must be of sufficient length to take into account such factors as the combustive quality of the fuel itself, the molecular weight of the fuel, and the rate at which the fuel is caused to flow through the channel at which the magnetic field(s) are focused. The normal magnetic field strength imposed on the fuel molecules as they flow through the channel is between 3000 and 7000 Gauss, preferably 6000.

Because a common use of the fuel-saver device of this invention can have a significant impact on the environment if used in the common automobile, mounting and adjusting our device, and the process for insuring its maximum efficiency improving ability will be described with regard to a gasoline burning automobile engine. First and foremost, your automobile should be physically checked for its operating efficiency, preferably thoroughly removing carbon and scale deposit in the fuel injector and nozzles. The device should be installed in the automobile's fuel line between the fuel pump and carburetor, as far from heated surfaces as possible for obvious reasons, for example, 100 to 250 mm in an auto.

In the case of a diesel fuel burning vehicle, the device should be mounted between the diesel fuel filter and the high pressure oil distributor pump, approximately 150–300 mm from the pump on the oil supply side. In the case of a motorcycle, the improved fuel-saver device of this invention should be connected in series within the fuel line at the tank and the carburetor, at least 50 mm from same. In any application, the user must always keep the fuel-saver device at a safe distance from heat producing parts of whatever vehicle it is installed within.

And further, when installing an improved fuel-saver device of this invention in a used vehicle, the engine oil must be changed after 3000 to 5000 kilometers, or approximately 100 hours of operating time. Used vehicles typically accumulate carbon deposits on the cylinders or combustion chambers in which the improved fuel-saver device is used. After the stated use with the device, the carbon is eliminated from the engine parts and ends up in the lubricating oil. Excess carbon in your engine's oil can have a debilitating effect on the effectiveness of the fuel saving and improved combustion efficiency of which the improved device of this invention is able to provide.

While the above description describes the preferred and best mode of operation of an improved fuel-saver device of this invention, it is meant for illustrative purposes only. Not meant to limit the scope of applicant's invention in any way.

What is claimed is:

1. An improved fuel source processing device for insertion into a fuel line feeding in fluid communication with a fuel combustion chamber, the device comprising:

a cylindrical housing including a cylindrical chamber having a fixed inner diameter creating an inner channel, with channel surfaces, the channel extending between oppositely disposed input and output ports and constructed such that an internal volume of the channel is defined by particular physical dimensions of the inner channel extending between the input and output ports;

at least one set of two permanent magnets, where each magnet includes distinct north and south poles, the two permanent magnets fixedly attached to opposite inner channel surfaces such that a north pole of each magnet faces the other, wherein fuel flowing through the channel passes a field generated by the positioning of the at least one set of two magnets;

wherein the improvement in the device resides in the limitation that the composition of an alloy from which both the magnets and the housing are constructed include low carbon steel and nickel in a particular range.

2. The improved fuel source processing device called out by claim 1, further comprising a second pair of diametrically opposed permanent magnets attached to inner channel surfaces at each magnet's south pole.

3. The improved fuel source processing device called out in claim 1, further comprising a third pair of diametrically opposed permanent magnets attached to inner channel surfaces at each magnet's south pole.

4. The improved fuel source processing device called out by claim 1, further comprising a fourth pair of diametrically opposed permanent magnets attached to inner channel surfaces at each magnet's south pole.

5. The improved fuel processing device called out by claim 1, further comprising a fifth pair of diametrically opposed permanent magnets attached to inner channel surfaces at each magnet's south pole.

6. The improved fuel-processing device of claim 1, wherein the direction of fuel flow through the device is not material to device operation.

7. The improved fuel processing device of claim 1, wherein said input and output ports are constructed in such a way that their connections at each side of a fuel line into which the device is inserted is hermetically sealed.

8. A process for improving fuel combusting efficiency, and decreasing amounts of non-combusted fuel molecules in combustion emission gases, the process including the steps of:

inserting an improved fuel processing device within a fuel line supplying a combustion chamber of a hydrocarbon combusting device;

wherein the fuel processing device includes a chamber containing an inner fuel flow channel defined by a set of dimensions of the inner channel and the surfaces of at least one pair of diametrically opposed magnets, wherein the fuel for combusting must pass en route to a combusting chamber, and wherein the magnetic force generated by the at least one pair of diametrically opposed magnets, and the material from which the chamber and magnets are constructed imposes a magnetic force on gases and fluids in the channel renders the fuel in an improved combusting state.

9. The process called out by claim 8, where the amount of nickel by weight in the nickel steel alloy is 0.50 percent.

* * * * *